United States Patent
Miyako (10) Patent No.: US 8,368,644 B2
(45) Date of Patent: Feb. 5, 2013

(54) OPERATION FEELING GIVING INPUT DEVICE

(75) Inventor: Ikuyasu Miyako, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 494 days.

(21) Appl. No.: 12/471,726

(22) Filed: May 26, 2009

(65) Prior Publication Data

US 2009/0295717 A1 Dec. 3, 2009

(30) Foreign Application Priority Data

May 28, 2008 (JP) ................................ 2008-140051

(51) Int. Cl.
G06F 3/033 (2006.01)
(52) U.S. Cl. ....................................... 345/157; 345/161
(58) Field of Classification Search ........... 345/157–162
See application file for complete search history.

(56) References Cited

U.S. PATENT DOCUMENTS

2005/0099388 A1* 5/2005 Matsumoto .................... 345/157
2005/0259076 A1* 11/2005 Hayasaka et al. ............. 345/161

FOREIGN PATENT DOCUMENTS

JP 2005-141675 6/2005
JP 2005-332325 12/2005

* cited by examiner

Primary Examiner — Amr Awad
Assistant Examiner — Aaron Midkiff
(74) Attorney, Agent, or Firm — Brinks Hofer Gilson & Lione (57) ABSTRACT

An operation feeling giving input device includes an operation member that is displaced to an arbitrary operational position according to the operation of an operator, actuators that change the operational position of the operation member separately from the operation of the operator by applying an operational force to the operation member, operational position detecting means that detects the operational position of the operation member, storage means that stores information about display areas of buttons displayed on a predetermined display screen, and control means. The control means outputs a control signal for displaying a pointer on a display screen at an indicated position corresponding to the operational position of the operation member on the basis of the operational position of the operation member, and drives the actuators so that the operational position of the operation member is changed to generate a lead-in force that moves the pointer toward the inside of the buttons displayed on the display screen. If the length of a display area of the button in a vertical direction is different from the length of the display area of the button in a horizontal direction, the control means calculates the magnitude of the lead-in force on the basis of a relative relationship between the indicated position of the pointer and any one of vertical and horizontal virtual central axes extending in the longitudinal direction through a central position of the display area.

6 Claims, 9 Drawing Sheets

OPERATION FEELING GIVING INPUT DEVICE

CROSS REFERENCE TO RELATED APPLICATION

The present invention contains subject matter related to and claims priority to Japanese Patent Application No. 2008-140051 filed in the Japanese Patent Office on May 28, 2008, the entire contents of which is incorporated herein by reference.

BACKGROUND

1. Technical Field

The invention relates to an operation feeling giving input device that can be used as an input device of various electronic devices, an in-vehicle electrical component, or the like.

2. Related Art

An operation feeling giving input device is known in the related art that moves a pointer on the display screen in accordance with the operational position of the operation member if a user operates an operation member such as a stick, and performs the control for leading a pointer toward the inside of a button if a pointer is positioned near a button on the display screen (for example, Japanese Unexamined Patent Application Publication No. 2005-141675 (pages 6 to 7, FIG. 4) and Japanese Unexamined Patent Application Publication No. 2005-332325 (pages 5 to 6, FIG. 4)). The lead-in force in the related art is applied to the operation member, which is actually operated by a user, as an external force (operational force). For this reason, a user can obtain operation feeling, which leads the pointer into the button, by the operation member.

Further, in the related art (Japanese Unexamined Patent Application Publication No. 2005-141675 (pages 6 to 7, FIG. 4)), the magnitude of the lead-in force is set according to a distance between the central position of a button and the position of a pointer. For example, the maximum value of a lead-in force is set at a position, which is distant from the central position to some extent, in the display area of a button. Then, as the distance is increased, the lead-in force is set to be described. Accordingly, if a user operates the operation member so that the pointer approaches the button, a large lead-in force is gradually generated, so that operation feeling for naturally leading the pointer into the button is given. In contrast, if a user make the pointer be distant from the central position of the button, a peak of the lead-in force appears at a certain position and the lead-in force is gradually decreased when the pointer passes by this position.

In addition, in the related art (Japanese Unexamined Patent Application Publication No. 2005-332325 (pages 5 to 6, FIG. 4)), if a pointer is positioned between a plurality of buttons having different sizes (for example, a square button and a rectangular button), a button corresponding to a lead-in destination is not determined according to a distance to the central position of each button but is determined according to a distance to the periphery of a button. In this case, since a pointer may be led into not a button that is simply close to the central position, but a button that is apparently close to the central position when a user sees the button, a user does not feel uncomfortable.

Since the above-mentioned methods in the related art are preferable in terms of giving natural operation feeling, the technical value is still high.

In addition, as described in the related art (Japanese Unexamined Patent Application Publication No. 2005-141675 (pages 6 to 7, FIG. 4)), for example, a button (rectangular button) having lengths, which are slightly different invertical and horizontal directions to some extent, is displayed in a method of calculating the magnitude of a lead-in force according to the distance to the central position of a button. In this case, if a pointer is moved to the periphery of the button in the longitudinal direction, a distance from the central position is increased as much as the pointer is moved and a lead-in force is gradually decreased. In this case, even though the pointer is apparently positioned near the periphery of the button, the applied lead-in force is very small. Accordingly, there is a problem in that it is difficult to match the actual operation feeling with appearance.

SUMMARY

According to an aspect of the invention, an operation feeling giving input device includes an operation member, an actuator, operational position detecting means, storage means, and control means. The operation member is displaced to an arbitrary operational position according to the operation of an operator. The actuator changes the operational position of the operation member separately from the operation of the operator by applying an operational force to the operation member. The operational position detecting means detects the operational position of the operation member. The storage means stores information about display area of a button that is displayed on a display screen. The control means outputs a control signal for displaying a pointer on the display screen at an indicated position corresponding to the operational position of the operation member, and drives the actuators to generate a lead-in force that changes the operational position of the operation member to move the pointer toward the inside of the button displayed on the display screen.

Further, if the length of a display area of the button in a vertical direction is different from the length of the display area of the button in a horizontal direction, the control means calculates the magnitude of the lead-in force on the basis of a relative relationship between the indicated position of the pointer and any one of vertical and horizontal virtual central axes extending in the longitudinal direction through a central position of the display area.

As described above, the input device according to the aspect of the invention applies an operational force to the operation member by driving the actuator, thereby generating a lead-in force that moves the pointer to the inside of the button displayed on the display screen. In this case, the operational position of the operation member corresponds to the indicated position that is indicated on the display screen by the pointer. Accordingly, if the operational position of the operation member is changed by the operational force of the actuator, the display position of the pointer is also moved on the display screen by the change. For this reason, a user, who is an operator, can actually feel a lead-in force from the operational force that is generated with the movement of the pointer on the display screen and is applied to the operation member. Accordingly, the user can clearly find operation feeling.

In addition, when a button having different length in vertical and horizontal directions is displayed on the display screen, the input device according to the aspect of the invention does not calculate a lead-in force under control simply according to the distance between the central position of the button and the indicated position of the pointer but calculates the magnitude of the lead-in force on the basis of a relative relationship between the indicated position of the pointer and a virtual central axis extending in the longitudinal direction of the button through a central position. For this reason, for example, even though the indicated position of the pointer is positioned at the periphery of the button in the longitudinal direction, the distance to the indicated position is relatively decreased by the two-dimensional length of the central axis. Accordingly, it is possible to calculate the magnitude of the sufficient lead-in force even at the periphery of the button in the longitudinal direction, so that it is possible to give clear operation feeling.

DESCRIPTION OF EXEMPLARY EMBODIMENTS

Embodiments of the invention will be described below with reference to drawings. An operation feeling giving input device according to an embodiment of the invention may be used as an input device (user interface) for an in-vehicle electrical component of, for example, various electronic devices (computer devices, audio devices, and video devices) and a car navigation device.

Summary of Embodiment

Figure 1:
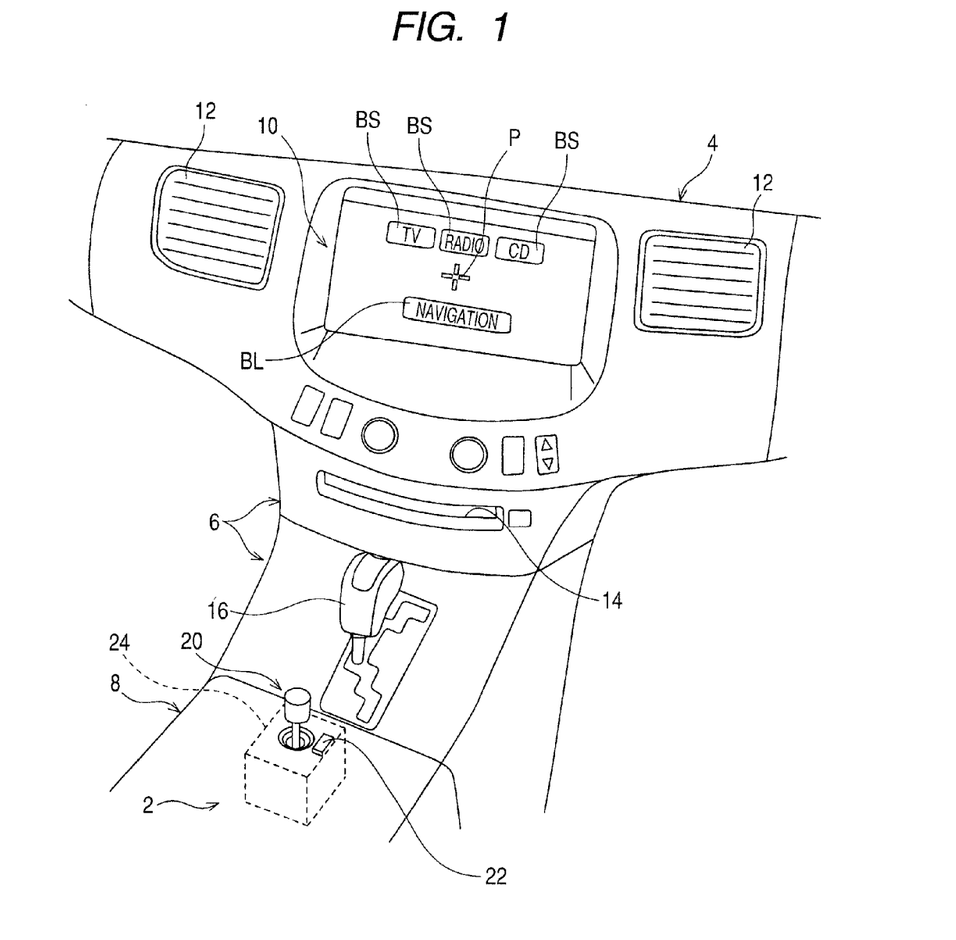
FIG. 1 is a partial perspective view of an in-vehicle component to which an input device according to an embodiment is applied.

FIG. 1 is a partial perspective view of an in-vehicle component to which an input device 2 according to an embodiment is applied. The in-vehicle component shown in FIG. 1 includes, for example, an instrument panel 4, a center console 6, and a floor console 8. The instrument panel 4 of them is an interior component that is disposed in a compartment of an automobile (on the front side of a front seat) in the width direction of the automobile. Further, the center console 6 is an interior component that is connected to a lower portion of the instrument panel 4, and the center console 6 is positioned in the middle as seen in the width direction of the automobile. Furthermore, the floor console 8 is an interior component that is disposed on a floor panel of the automobile so as to be connected to the center console 6, and the floor console 8 is positioned between a driver's seat and a passenger seat (not shown) in the compartment of the automobile.

The instrument panel 4 is provided with, for example, a display device 10 such as a liquid crystal display that is incorporated at the middle position in the width direction, and vents 12 of an air conditioner (air conditioner in the compartment of the automobile) that are provided on both sides of the display device. Further, various switches (of which reference numerals are omitted) are embedded in the instrument panel 4 below the display device 10. These various switches are used, for example, to set the temperature of the air conditioner or to control air volume, to control the volume of an audio device (not shown), to select a radio broadcast channel, and to change an audio track.

The center console 6 is provided with an entrance 14 for a music CD (compact disc) that is formed at an upper portion of the center console, and a shift lever 16 that is provided at a lower portion of the center console.

The floor console 8 is provided with an operation stick 20 and a push switch 22 that form the input device 2 according to this embodiment. The input device 2 includes a mechanical box 24, and the mechanical box 24 includes a mechanism component that is connected to the operation stick 20 and the push switch 22.

The operation stick 20 is an operation member that receives the operation of a user (driver) while being interlocked with the display device 10. Further, the push switch 22 is an input device that also receives the operation of a user while being interlocked with the display device 10. Specifically, a pointer P (for example, a cross pointer or a cross cursor) and images of various buttons BL and BS are displayed on a display screen of the display device 10. Accordingly, if a user tilts the operation stick 20 in an arbitrary direction, the pointer P is moved on the display screen while being interlocked with the tilting of the operation stick. Further, if a user presses the push switch 22 when the pointer P is moved to any one of the buttons BL and BS, it is possible to select a function that corresponds to the buttons BL and BS. Meanwhile, according to this example, functions of "TV", "radio", and "CD" correspond to three buttons BS that are displayed at an upper portion of the display screen, and a function of "navigation" corresponds to a horizontally elongated button BL that is displayed at a lower portion of the display screen. Accordingly, in order to select anyone of functions, a user may move the pointer P to the buttons BL and BS corresponding to desired functions by operating the operation stick 20, and may operate the push switch 22 in this state.

Structural Example

FIGS. 2 and 3 are views showing a structural example of the mechanical box 24. The structure of the mechanical box 24 will be described below.

Figure 2A:
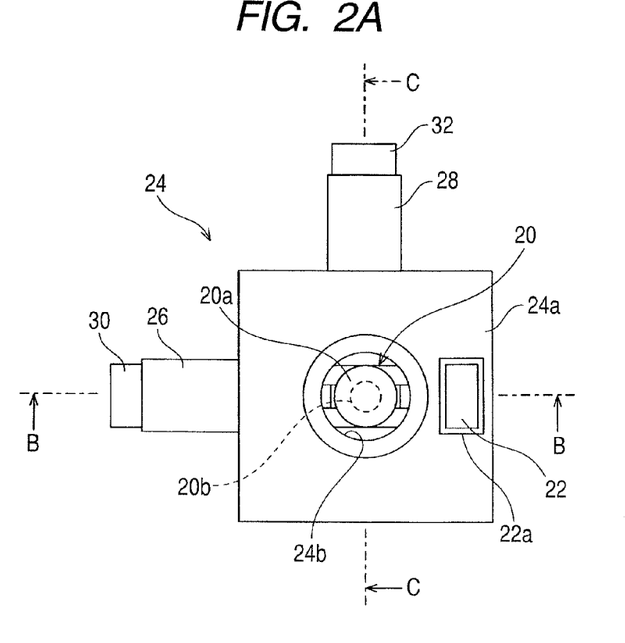
FIG. 2 is a view (1/2) showing a structural example of a mechanical box.

FIG. 2A is a plan view of the mechanical box 24. The mechanical box 24 includes a case 24a, and the case 24a has the shape of, for example, a hollow cube. A circular opening 24b is formed at an upper surface of the case 24a, and the operation stick 20 extends to pass through the upper surface of the case 24a through the opening 24b in a vertical direction. Meanwhile, the operation stick 20 includes a knob 20a and a lever 20b, and the knob 20a is fixed to the end of the lever 20b. The case 24a may be formed by the combination of a plurality of parts.

Further, the push switch 22 is provided on the upper surface of the case 24a. The push switch 22 is provided with, for example, a switch box 22a, and the switch box 22a is further provided with electronic components, such as a microswitch (not shown), a switch circuit connected to the microswitch, and wiring.

A first motor 26 and a second motor 28 are fixed to the outer surface of the case 24a. Output shafts of the two motors 26 and 28 extend toward the inside of the case 24a so as to be orthogonal to each other. Further, extended lines of the output shafts intersect each other at the center of the operation stick 20. Meanwhile, through holes (of which reference numerals are omitted in the drawing) into which the output shafts are inserted are formed at the case 24a.

Further, the first and second motors 26 and 28 are provided with first and second rotation sensors 30 and 32, respectively. The rotation sensors 30 and 32 output detection signals that correspond to the rotation angles and rotation directions of the corresponding motors 26 and 28. The rotation sensors 30 and 32 may be formed by the combination of discs with slits and photointerrupters that include, for example, two light-receiving elements so as to also detect rotation direction.

Figure 2B:
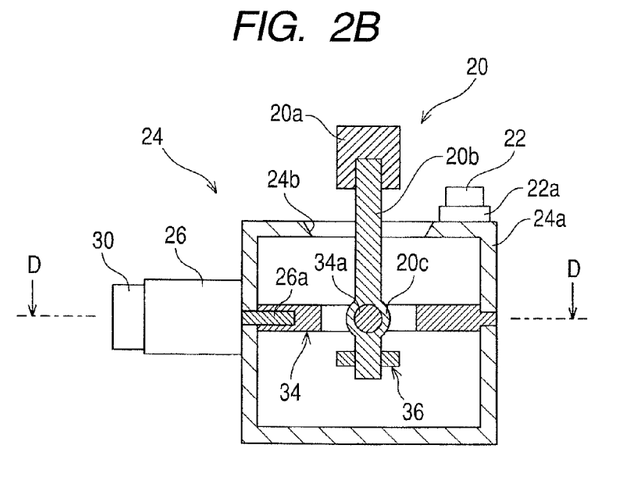

FIG. 2B shows a longitudinal section of the mechanical box 24 (section taken along a line B-B of FIG. 2A) A first driving member 34 is received in the case 24a, and one end of the first driving member 34 is connected to an output shaft 26a of the first motor 26. Further, the other end of the first driving member 34 is rotatably supported by a side plate of the case 24a on the side opposite to the first motor 26. The position where the other end of the first driving member is supported is on the extended line of the output shaft 26a. For this reason, as the output shaft 26a of the first motor 26 is rotated, the first driving member 34 can be rotated together with the output shaft of the first motor as a single body. Meanwhile, an example where the output shaft 26a and the first driving member 34 are directly connected to each other has been disclosed herein, but a speed reduction mechanism may be provided between the output shaft and the first driving member.

A shaft 34a is formed at the middle position of the first driving member 34. The shaft 34a extends in a direction orthogonal to the output shaft 26a. A bearing hole 20c is formed at the lever 20b, and the shaft 34a passes through the bearing hole 20c of the lever 20b. In this case, the lever 20b is supported by the shaft 34a so as to swing (so called rock) in a horizontal direction in FIG. 2B. However, the lever 20b is not moved in other directions, and the lever 20b is rotated (swings in a forward and backward direction in FIG. 2B) together with the first driving member as a single body as the first driving member 34 is rotated.

Figure 3C:
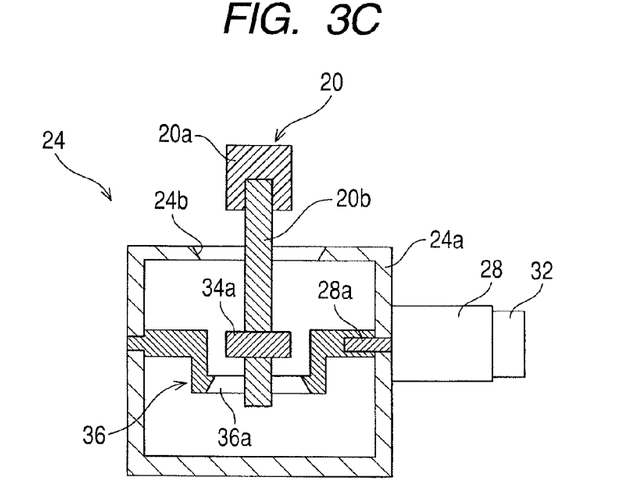
FIG. 3 is a view (2/2) showing a structural example of a mechanical box.

FIG. 3C shows another longitudinal section of the mechanical box 24 (section taken along a line C-C of FIG. 2A). A second driving member 36 separate from the first driving member 34 is received in the case 24a, and one end of the second driving member 36 is connected to an output shaft 28a of the second motor 28. Further, the other end of the second driving member 36 is rotatably supported by a side plate of the case 24a on the side opposite to the second motor 28. The position where the other end of the second driving member is supported is on the extended line of the output shaft 28a. For this reason, as the output shaft 28a of the second motor 28 is rotated, the second driving member 36 is rotated together with the output shaft of the second motor as a single body. Even in this case, likewise, a speed reduction mechanism may be provided between the output shaft 28a and the second driving member 36.

The middle portion of the second driving member 36 is bent in the shape of a crank, so that appropriate clearance is secured between the first and second driving members 34 and 36. Further, a guide groove 36a is formed at the crank-shaped portion of the second driving member 36, and the lower end of the lever 20b is inserted into the guide groove 36a. The guide groove 36a extends in the longitudinal direction of the second driving member 36 (in the horizontal direction in FIG. 3C), and the width of the guide groove is slightly larger than the outer diameter of the lever 20b. Furthermore, the length of the guide groove 36a is larger than a range where the lower end of the lever 20b is moved by the rotation of the first driving member 34. Accordingly, when the lever 20b swings, the lower end of the lever can be freely moved in the guide groove 36a in the longitudinal direction of the guide groove. Further, even though the lever 20b swings up to the maximum angle, the lower end of the lever is not separated from the guide groove 36a. However, the lever 20b is not moved in the guide groove 36a in any direction except for the longitudinal direction of the guide groove, and the lever 20b is rotated (swings in the forward and backward direction in FIG. 3C) together with the second driving member as a single body as the second driving member 36 is rotated.

Figure 3D:
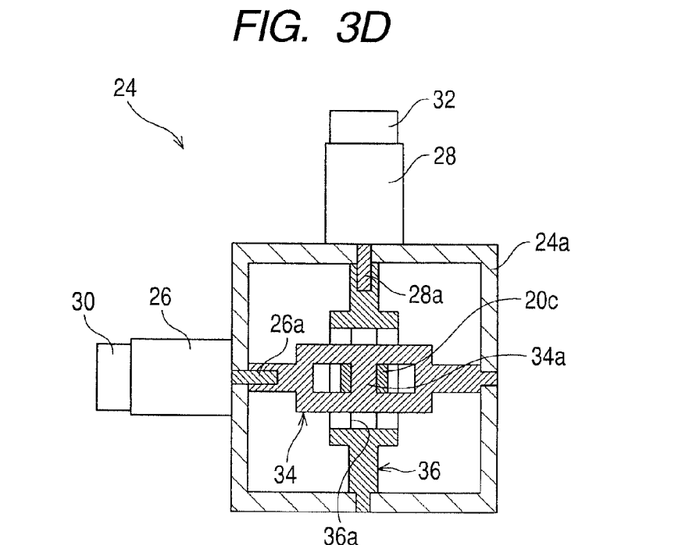

FIG. 3D shows a cross section of the mechanical box 24 (section taken along a line D-D of FIG. 2A). As the first and second driving members 34 and 36 are rotated, the lever 20b can swing as described above in the mechanical box 24 in two directions within the range where the lever is moved. Accordingly, if the first and second motors 26 and 28 are driven, the mechanical box 24 can make the operation stick 20 be tilted in an arbitrary direction with respect to the case 24a by an arbitrary angle in the range where the lever 20b is moved.

Structure Relating to Control

Figure 4:
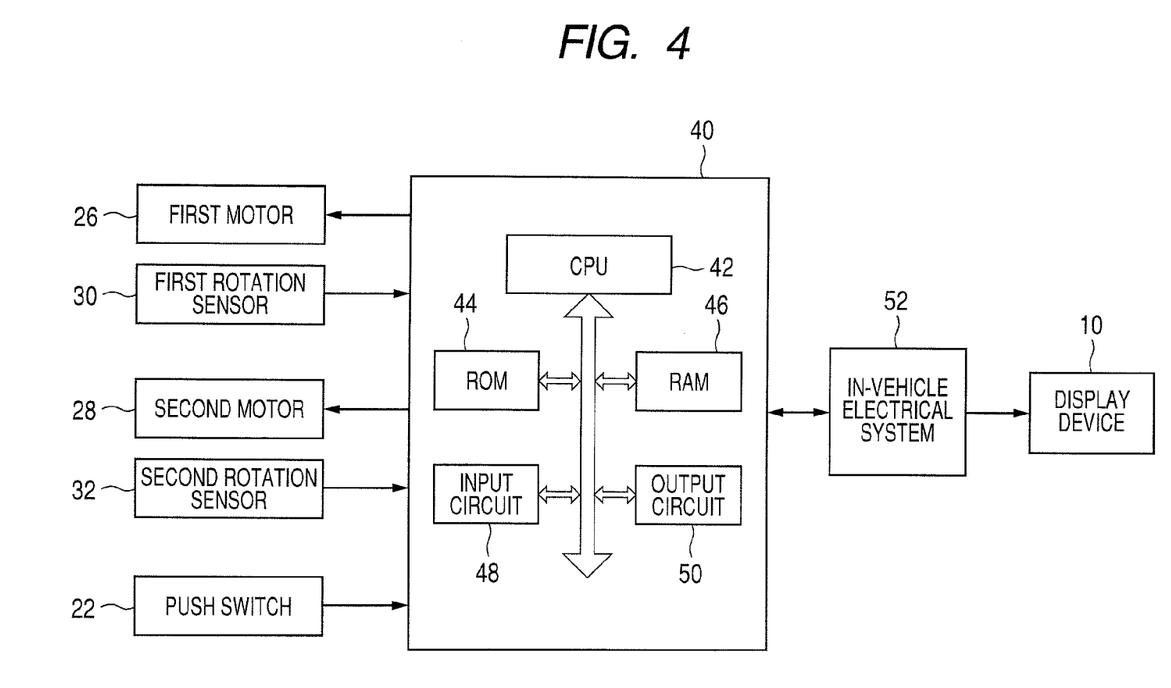
FIG. 4 is a block diagram schematically showing the structure that relates to the control of the input device.

FIG. 4 is a block diagram schematically showing the structure that relates to the control of the input device 2. The input device 2 includes a control unit 40, and the control unit 40 is a control computer that includes a CPU 42 and memory devices, such as a ROM 44 and a RAM 46. Further, the control unit 40 includes drivers, such as an input circuit 48 and an output circuit 50, and peripheral ICs, such as an interruption controller and a clock generating circuit (not shown).

The operation of the first and second motors 26 and 28 is controlled by the control unit 40. That is, the control unit 40 applies drive signals to the first and second motors 26 and 28, rotates the output shafts 26a and 28a in determined directions by necessary rotation angles, and generates necessary torque. Accordingly, an operational force is applied to the operation stick 20. In this case, the magnitude and direction of the operational force (vector quantity) are determined depending on the rotation angles, rotation directions of the motors 26 and 28 and the torque at that time. Further, the control unit 40 can detect the rotation angle and rotation direction of each of the motors 26 and 28 on the basis of the detection signals that are output from the rotation sensors 30 and 32. Meanwhile, the control unit 40 is provided in, for example, the instrument panel 4.

Input Object System

The control unit 40 of the input device 2 outputs a control signal that corresponds to an input operation of a user to an in-vehicle electrical system 52 of the automobile. The in-vehicle electrical system 52 is a known system that operates a navigation device of an automobile, and an air conditioner, an audio device, or a television while being interlocked with the navigation device. Meanwhile, the display device 10 functions as a part of the in-vehicle electrical system 52. The control signal, which is output from the control unit 40 to the in-vehicle electrical system 52, reflects the operation (intention) of the user that moves the pointer P on the display screen of the display device 10 or clicks the buttons BL and BS.

Basic Operation

If the input device 2 is applied to the input device of the in-vehicle electrical system 52, it is possible to achieve the following basic operation.

First, the control unit 40 of the input device 2 detects the operational position of the operation stick 20 at the present time on the basis of the detection signal that is output from each of the sensors 30 and 32, and outputs an indicated position corresponding to the detection result as a control signal. The operational position of the operation stick 20 is detected in real-time (for example, in the interruption cycle of several milliseconds), and a position indicated in real-time is sent to the in-vehicle electrical system 52 as a control signal in each case.

Further, when a user operates the push switch 22, the control unit 40 outputs the operation signal as a control signal. The operation signal of the push switch 22 is sent to the in-vehicle electrical system 52, for example, as an external interruption signal.

A control part (not shown) of the in-vehicle electrical system 52 performs the control for displaying the pointer P on the display device 10 on the basis of the position that is received from the control unit 40 and indicated in real-time. Further, the control part of the system 52 performs the control for determining the selection or non-selection of functions, which correspond to the buttons BL and BS, on the basis of the operation signal of the push switch 22.

Furthermore, display information about the buttons BL and BS, which are being currently displayed, is supplied to the control unit 40 from the in-vehicle electrical system 52. If the display screen of the display device 10 is a two-dimensional plane (x-y coordinate plane), the information means the positions (central coordinates) of the buttons BL and BS that are displayed at that time, and the size of the display areas of the buttons (length in vertical and horizontal directions). The control unit 40 stores the display information, which is supplied from the system 52, for example, in the RAM 46. If the display positions and the size of the buttons BL and BS of the system 52 are changed, the display information is updated according to the change.

Alternatively, the display information of the buttons BL and BS may be previously stored in the ROM 44 of the control unit 40, and the control unit 40 may receive only the kinds (for example, button numbers) of the buttons BL and BS from the system 52 and read out the display information of the corresponding buttons BL and BS from the ROM 44. In any case, since storing the display information of the buttons BL and BS, the control unit 40 can recognize the display areas of the buttons BL and BS and the indicated position of the pointer P on the memory space (RAM 46) thereof.

Generation of Lead-In Force

The input device 2 according to this embodiment is an input device that gives operation feeling to a user. An operational force is applied to the operation stick 20 as described above, so that a user may actually feel the operation feeling. In particularly, according to this embodiment, the operation of the motors 26 and 28 is controlled in order to generate a lead-in force that moves the pointer P toward the inside of the buttons BL and BS on the display screen of the display device 10. Accordingly, while operating the operation stick 20 and moving the pointer P by oneself, a user receives such operation feeling that the pointer P is led to the inside of the buttons BL and BS.

Control Method

A specific control method, which achieves the basic operation of the control unit 40 and the generation of the lead-in force, will be described below.

Device Management Process

Figure 5:
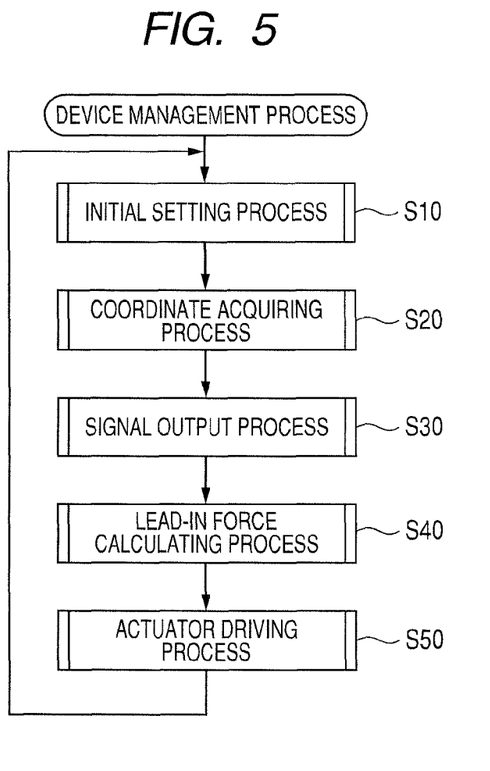
FIG. 5 is a flowchart illustrating an example of a procedure of a device management process.

FIG. 5 is a flowchart illustrating an example of a procedure of a device management process that is performed by the CPU 42 of the control unit 40. The device management process is stored, for example, in the ROM 44 as a main control program. If the CPU 42 is driven as power is supplied to the control unit 40 (as a main key switch of the automobile is turned on), the CPU 42 performs the device management process.

The device management process is formed by the set of a plurality of processes (program module) that is normally performed by the CPU 42. The CPU 42 performs a plurality of processes in an order that is described in the device management process. The summary of each of the processes will be described below.

In Step S10, first, the CPU 42 performs an initial setting process. This process is a process that defines (initialize) a reference position relating to the rotation of each of the motors 26 and 28 on the basis of the detection signal output from each of the sensors 30 and 32. The CPU 42 defines the reference position of each of the motors 26 and 28 by this process, and makes this reference position correspond to the reference position (neutral position) of the operation stick 20 so as to define the reference position. The reference position, which is defined herein, is saved, for example, in the RAM 46, and is backed up even after the supply of power to the control unit 40 is interrupted. Meanwhile, this process is not necessarily performed every drive, and may be performed at predetermined intervals (for example, ten times of drive).

In Step S20, next, the CPU 42 performs a coordinate acquiring process. This process is a process that acquires coordinates (x-y coordinates) corresponding to the current operational position of the operation stick 20. For example, on the basis of the detection signal that is output from each of the sensors 30 and 32, the CPU 42 calculates the rotation direction and rotation angle of each of the motors 26 and 28 to be rotated, from the reference position that has been defined in the prior initial setting process. Further, the CPU 42 calculates how far the operation stick 20 is displaced from the reference position on the virtual plane from the rotation direction and the rotation angle at this time, and acquires the coordinates of the current operational position from the results of the calculation. Meanwhile, the coordinates, which have been acquired herein, correspond to the indicated position of the pointer P on the display screen.

In Step S30, after that, the CPU 42 performs a signal output process. This process is a process that outputs a control signal to the in-vehicle electrical system 52 from the control unit 40 of the input device 2. Specifically, the CPU 42 transmits the coordinates that have been acquired in the prior coordinate acquiring process, that is, the indicated position of the pointer P to the in-vehicle electrical system 52 as the control signal that is output from the control unit 40. The external in-vehicle electrical system 52 controls the display position of the pointer P on the display device 10, on the basis of the control signal.

In Step S40, subsequently, the CPU 42 performs a lead-in force calculating process. This process is a process that calculates a lead-in force by using the current coordinates (x,y) acquired in the prior coordinate acquiring process as a parameter. Meanwhile, a specific calculation method will be described below with reference to another flowchart.

In Step S50, the CPU 42 performs an actuator driving process. This process is a process that drives each of the motors 26 and 28 on the basis of the calculation result of the prior lead-in force calculating process so as to actually generate a lead-in force.

Further, if an operation signal (ON signal) is input from the push switch 22 at this time, the CPU 42 performs an interrupt event process and sends an external interruption signal to the in-vehicle electrical system 52 as described above.

The CPU 42 of the control unit 40 normally performs the above-mentioned processes, so that the basic operation of the input device 2 and an operation for giving operation feeling are achieved. Further, in particular, a unique calculation method is employed in this embodiment to generate a lead-in force applied for the elongated button BL. A plurality of examples of the procedure of the method of calculating the lead-in force in this embodiment will be described below.

First Example of Procedure

Figure 6:
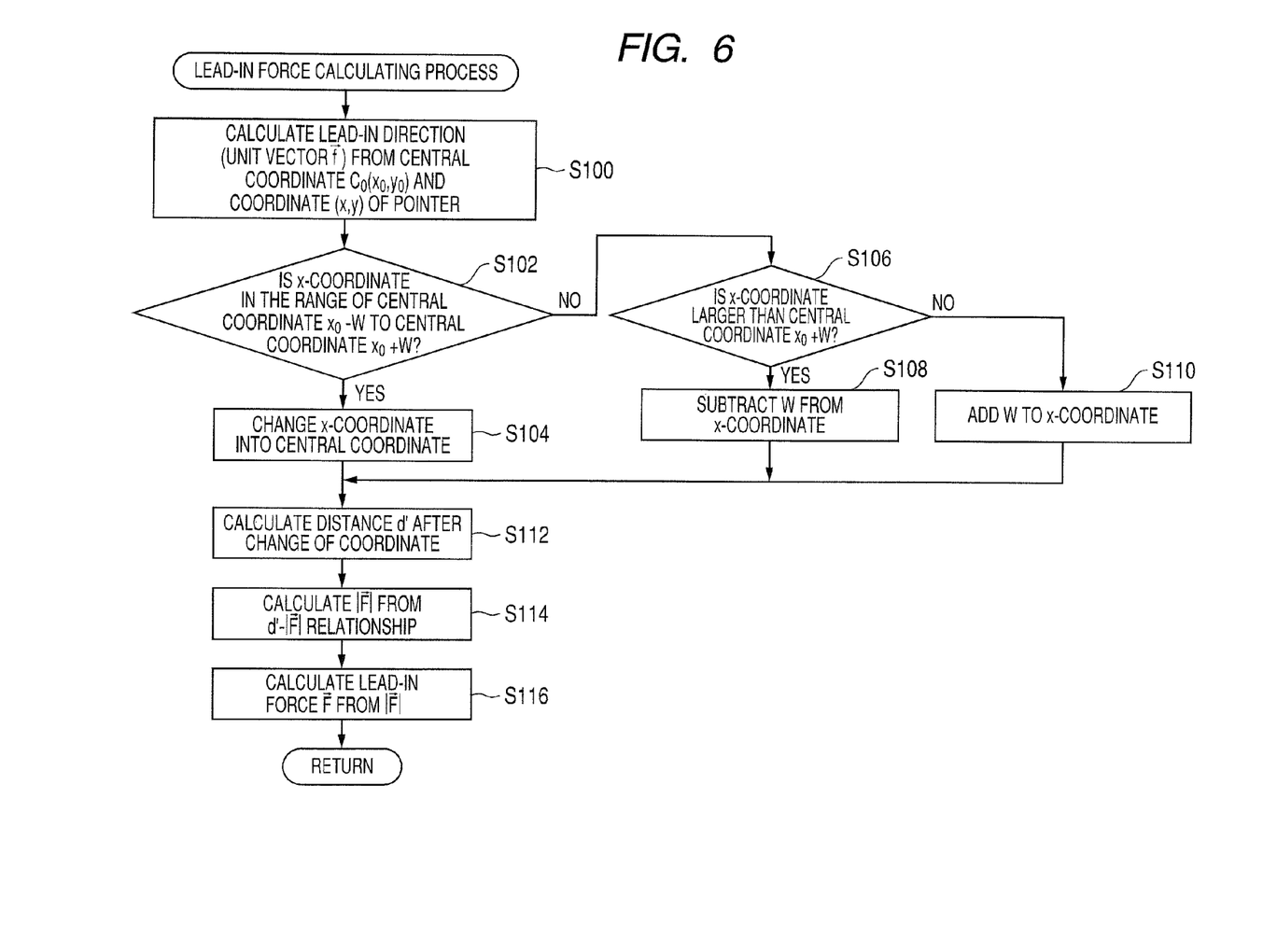
FIG. 6 is a flowchart illustrating a first example of a procedure of a lead-in force calculating process.

FIG. 6 is a flowchart illustrating a first example of a procedure of a lead-in force calculating process. The contents of a calculation process will be described along each procedure.

In Step S100, the CPU 42 calculates a lead-in direction (unit vector $\vec{f}$) on the basis of the central coordinates $C_0(x_0, y_0)$ of the button BL and the current coordinates (x,y) of the pointer P. Meanwhile, the lead-in direction is, for example, a direction from the current position of the pointer P toward the central position of the button BL.

In Step S102, next, the CPU 42 determines whether the x-coordinate of the pointer P satisfies the following conditional expression (1).

$$(x_0-W) \leq x \leq (x_0+W) \quad \text{Conditional Expression (1)}$$

For example, the value W corresponds to a distance between the central coordinate $x_0$ of the button BL and the boundary of the display area in the longitudinal direction (x-axis direction). That is, the display area of the button BL has a length of "W×2" in the longitudinal direction. Accordingly, if the x-coordinate of the pointer P is positioned in the display area ($x_0 \pm W$) of the button BL, the CPU 42 determines that the conditional expression is satisfied (Yes) and then performs Step S104.

In Step S104, the CPU 42 changes the current x-coordinate of the pointer P into the central coordinate $x_0$. Accordingly, it is considered that the indicated position of the pointer P is positioned at the central position of the button BL in the x-axis direction when a lead-in force is calculated later.

In contrast, if it is determined that the conditional expression (1) is not satisfied (No in Step S102), the CPU 42 performs Step S106.

In Step S106, the CPU 42 determines whether the x-coordinate of the pointer P satisfies the following conditional expression (2).

$$(x_0+W) < x \quad \text{Conditional Expression (2)}$$

That is, if the x-coordinate of the pointer P is positioned outside the display area ($x_0+W$) of the button BL as seen in the positive direction, the CPU 42 determines that the conditional expression is satisfied (Yes) and then performs Step S108.

In Step S108, the CPU 42 subtracts W from the x-coordinate in this case (x=x−W). Accordingly, it is considered that the indicated position of the pointer P is positioned at a position shifted toward the central position of the button BL by a distance W in the x-axis direction when a lead-in force is calculated later.

Meanwhile, if the conditional expression (2) is not satisfied, this means that the x-coordinate of the pointer P is positioned outside the display area ($x_0-W$) of the button BL as seen in the negative direction. In this case, the CPU 42 determines that the conditional expression is not satisfied (No), and then performs Step S110.

In Step S110, the CPU 42 adds W to the x-coordinate (x=x+W). Accordingly, it is considered that the indicated position of the pointer P is positioned at a position shifted toward the central position of the button BL by a distance W in the x-axis direction when a lead-in force is calculated later.

In any case, if any one of the above-mentioned Steps S104, S106, and S110 is performed according to the current x-coordinate of the pointer P, the CPU 42 performs Step S112.

In Step S112, the CPU 42 calculates a distance d' between the central position of the button BL and the indicated position of the pointer P when the x-coordinate is changed. The calculation in this case may be performed using, for example, the following expression.

$$d' = \sqrt{(x-x_0)^2 + (y-y_0)^2}$$

In Step S114, after that, the CPU 42 calculates a scalar quantity $|\vec{F}|$ of a specific lead-in force from a correspondence relationship between the distance d' and the magnitude of the lead-in force. For example, a d'-$|\vec{F}|$ diagram (function), which has been previously prepared, may be used for this calculation. Meanwhile, an example of the d'-$|\vec{F}|$ diagram will be described below with reference to another drawing.

In Step S116, the CPU 42 calculates a lead-in force ($\vec{F}$) to be applied, from the lead-in force $|\vec{F}|$ and the lead-in direction (unit vector $\vec{f}$) that is initially required.

If the above-mentioned procedure is performed, the CPU 42 returns to the device management process and then performs the actuator driving process (Step S50 in FIG. 5). Specifically, the CPU 42 decomposes the required lead-in force ($\vec{F}$) into an x-direction component and a y-direction component, and specifically controls the rotation direction, the rotation angle, and the generated torque of each of the motors 26 and 28. Accordingly, an operational force is actually applied to the operation stick 20, so that a lead-in force ($\vec{F}$) is generated and operation feeling is given to a user.

Illustration of First Example of Procedure

FIG. 7 is a view showing an image of a lead-in force that is generated by the first example of the procedure, and the d'-$|\vec{F}|$ diagram (linear graph) that can be used for the calculation of the scalar quantity $|\vec{F}|$. The generating mechanism of a lead-in force will be described below using illustration.

Image of Lead-In Force

Figure 7A:
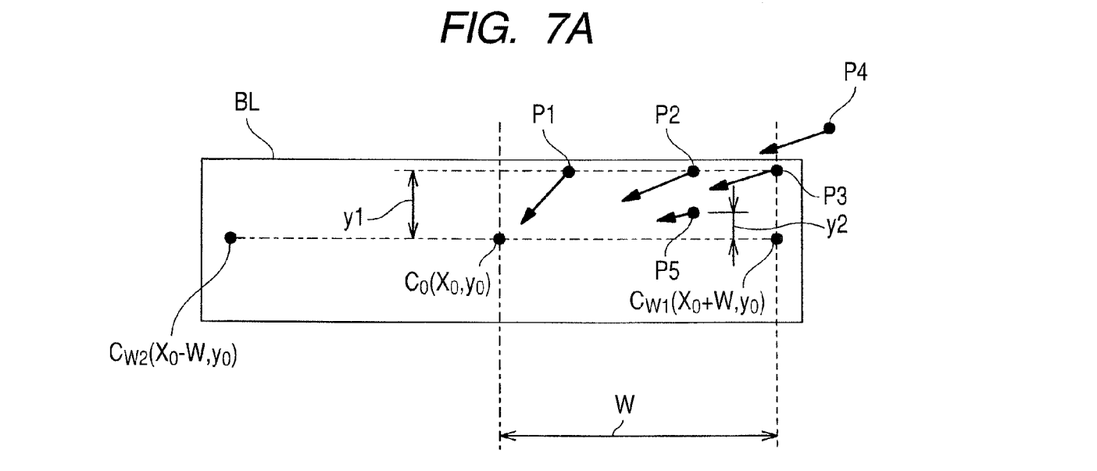
FIG. 7 is an image view and a d'-|$\vec{F}$| diagram of a lead-in force that is generated in the first example of the procedure.

Referring to FIG. 7A, the lead-in force is calculated by the first example of the procedure. Accordingly, for example, even though the indicated position of the pointer P becomes sequentially distant in the horizontal direction (P1→P2→P3 in FIG. 7A) from the central position of a button BL of which the length in the horizontal direction (x-axis direction) is larger than that in the vertical direction (y-axis direction), it is possible to continuously generate a sufficient lead-in force. Further, even though the indicated position P4, which is positioned outside the display area of the button BL, is very distant from the central position in the horizontal direction, it is possible to generate a sufficient lead-in force.

Figure 7B:
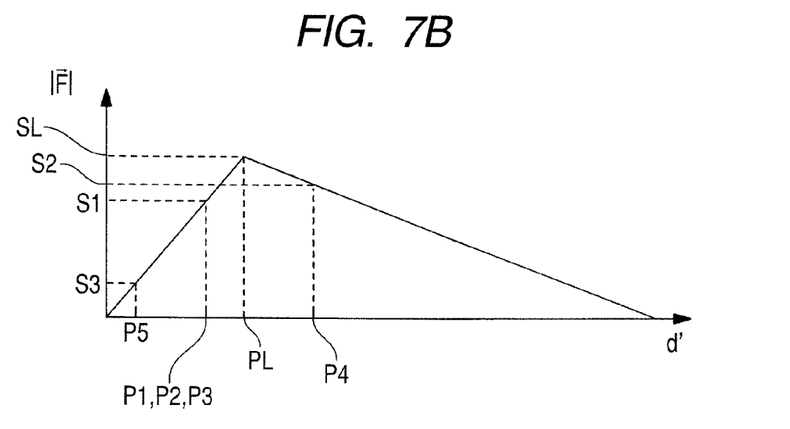

In FIG. 7B, according to a relationship between the distance d' and the scalar quantity $|\vec{F}|$, as the distance d' is increased, the scalar quantity $|\vec{F}|$ is also increased and the scalar quantity reaches the maximum value SL at a certain distance PL. Meanwhile, the distance PL may be appropriately set in the display area of the button BL. After that, if the distance d' is increased, the scalar quantity $|\vec{F}|$ is gradually decreased in this case and becomes zero when the pointer deviates from the display area of the button BL to some extent. Meanwhile, the relationship may be previously stored in the ROM 44, and may be calculated from a linear function expression by using the distance d' as a variable in each case.

Case of "$(x_0-W) \leq x \leq (x_0+W)$"

Indicated Position P1

For example, it is assumed that the indicated position P1 is positioned close to the central position $C_0$ in the display area of the button BL. The x-coordinate of the indicated position P1 is positioned in the range that is within the distance W from the central coordinate $x_0$. In this case, if the conditional expression (1) is satisfied (Yes in Step S102), the distance d' is calculated while the central coordinate $x_0$ is used as the x-coordinate at this time. Accordingly, the distance d' in this case becomes a distance y1 between the x axis and the indicated position P1.

As a result, if the scalar quantity $|\vec{F}|$ of the indicated position P1 is required from the relationship diagram, a scalar quantity S1 corresponding to the distance y1 is obtained. Further, since the direction (unit vector $\vec{f}$) of the lead-in force is always toward the central position, the lead-in force S1 toward the central position is generated at the indicated position P1.

Indicated Positions P2 and P3

Further, since the x-coordinates of indicated positions P2 and P3 are positioned in the range that is within the distance W from the central coordinate $x_0$, the conditional expression (1) is satisfied (Yes in Step S102). Accordingly, since the distance d' is calculated while the central coordinate $x_0$ is used as the x-coordinates, the distance d' becomes a distance y1 between the x axis and each of the indicated positions P2 and P3.

Even when the scalar quantity $|\vec{F}|$ of the each of the indicated positions P2 and P3 is required, the scalar quantity S1 corresponding to the distance y1 is obtained like the case of the indicated position P1. As a result, the lead-in force S1 toward the central position is also generated at each of the indicated positions P2 and P3.

Indicated Position P5

Since the x-coordinate of the indicated position P5 is also positioned in the range that is within the distance W from the central coordinate $x_0$, the conditional expression (1) is satisfied (Yes in Step S102). Accordingly, even in this case, the distance d' is calculated while the central coordinate $x_0$ is used as the x-coordinate. Therefore, the distance d' becomes a distance y2 between the x axis and the indicated position P5.

Further, when the scalar quantity $|\vec{F}|$ of the indicated position P5 is required, a scalar quantity S3 corresponding to the distance y2 is obtained. As a result, a lead-in force S3 toward the central position is generated at the indicated position P5.

Case of "$x<(x_0-W)$" or "$(x_0+W)<x$"

Indicated Position P4

The indicated position P4, which is positioned outside the display area of the button BL, will be considered below. The x-coordinate of the indicated position P4 is distant from the central coordinate $x_0$ by a distance larger than the distance W. In this case, if the conditional expression (2) is satisfied (Yes in Step S106), the distance d' is calculated while a position shifted toward the central coordinate $x_0$ by a distance W is used as the x-coordinate at this time. Accordingly, the distance d' in this case becomes a distance between the indicated position P4 and the position $C_{W1}(x_0+W, y_0)$ of the boundary of the display area of the button BL, as seen in the positive direction.

Further, if the scalar quantity $|\vec{F}|$ of the indicated position P4 is required from the relationship diagram, a scalar quantity S2 corresponding to the required distance is obtained. As a result, a lead-in force S2 toward the central position is generated at the indicated position P5, and the lead-in force is larger than that at each of the indicated positions P1, P2, P3, and P5.

As described above, the CPU 42 of the control unit 40 calculates a lead-in force by the first example of the procedure. Accordingly, for example, even though the indicated position of the pointer P becomes distant from the central position in the horizontal direction in the display area of the horizontally elongated button BL, it is possible to continuously generate a sufficient lead-in force. Further, even though the indicated position of the pointer P is positioned outside the display area of the button BL in the horizontal direction, it is possible to likewise generate a sufficient lead-in force.

Second Example of Procedure

Figure 8:
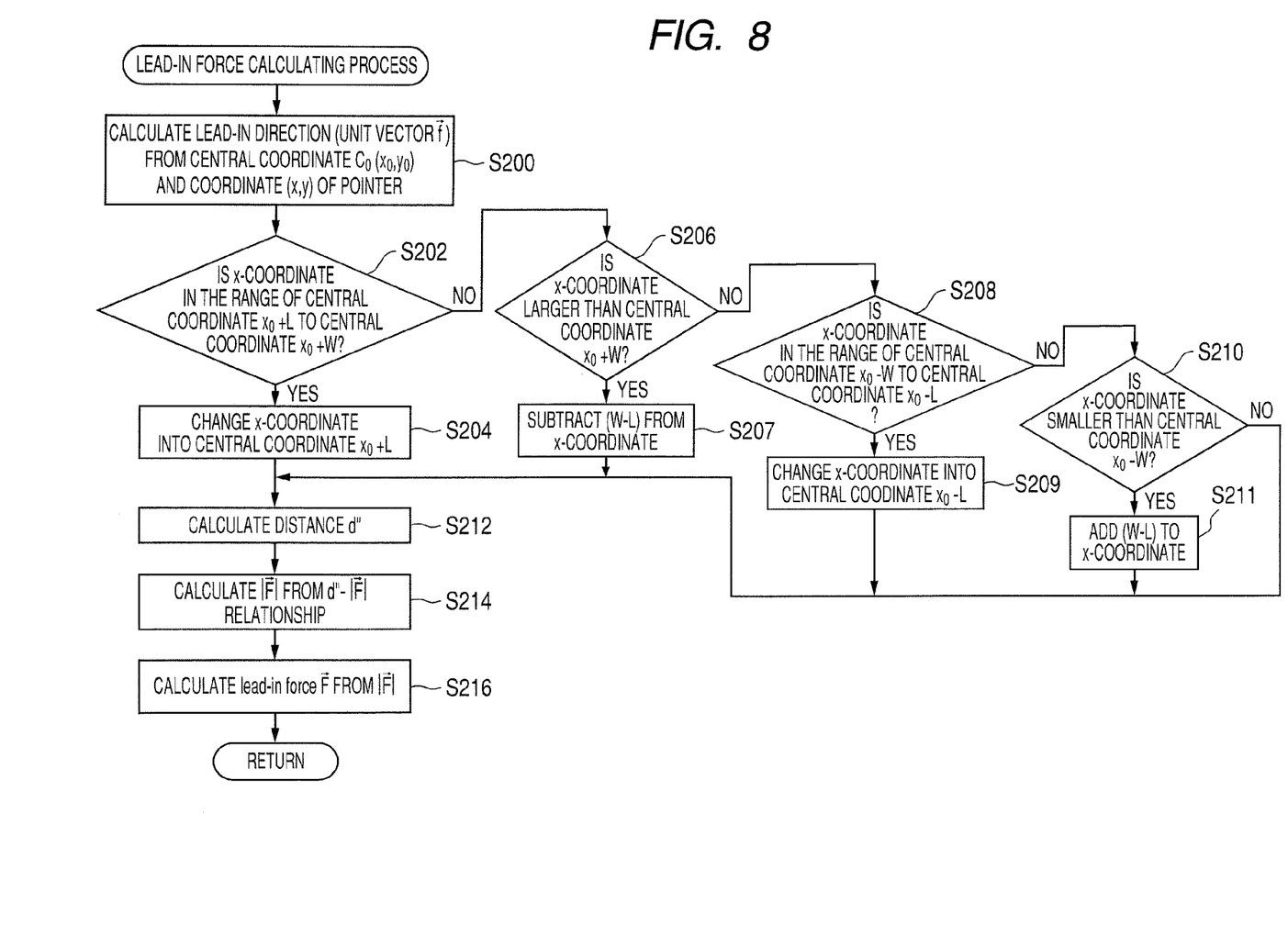
FIG. 8 is a flowchart illustrating a second example of the procedure of the lead-in force calculating process.

Next, FIG. 8 is a flowchart illustrating a second example of the procedure of the lead-in force calculating process. The contents of the calculation process will be described along each procedure.

In Step S200, the CPU 42 calculates a lead-in direction (unit vector $\vec{f}$) on the basis of the central coordinates $C_0(x_0, y_0)$ of the button BL and the current coordinates (x,y) of the pointer P. Meanwhile, the specific contents are the same as those of Step S100 of the first example of the procedure.

In Step S202, next, the CPU 42 determines whether the x-coordinate of the pointer P satisfies the following conditional expression (3).

$(x_0+L) \leq x \leq (x_0+W)$    Conditional Expression (3)

The value L corresponds to a prescribed distance between the central coordinate $x_0$ of the button BL and a prescribed position (for example, referred to as $C_{L1}$ or $C_{L2}$) that is positioned on the x axis. Meanwhile, the prescribed position is a position where a scalar quantity of an applied force becomes maximum in the x-axis direction. Further, the value W is the same as that of the first example of the procedure. Accordingly, if the x-coordinate of the pointer P is positioned in the display area $(x_0+W)$ of the button BL in the positive direction and is positioned at a position distant from the central position by the prescribed distance L or more, the CPU 42 determines that the conditional expression (3) is satisfied (Yes) and then performs Step S204.

In Step S204, the CPU 42 changes the current x-coordinate of the pointer P into the central coordinate $x_0+L$. Accordingly, it is considered as follows: the indicated position of the pointer P is positioned at a position, which is shifted from the central position of the button BL in the positive direction of the x-axis direction by the distance L, when a lead-in force is calculated later.

In contrast, if it is determined that the conditional expression (3) is not satisfied (No in Step S202), the CPU 42 performs Step S206.

In Step S206, the CPU 42 determines whether the x-coordinate of the pointer P satisfies the following conditional expression (4).

$$(x_0+W) < x \qquad \text{Conditional Expression (4)}$$

That is, if the x-coordinate of the pointer P is positioned outside the display area $(x_0+W)$ of the button BL as seen in the positive direction, the CPU 42 determines that the conditional expression is satisfied (Yes) and then performs Step S207.

In Step S207, the CPU 42 subtracts $(W-L)$ from the x-coordinate in this case $(x=x-(W-L))$. Accordingly, it is considered as follows: the indicated position of the pointer P is positioned at a position, which is shifted toward the central position of the button BL in the x-axis direction by the difference (referred to as a specific distance) between the distances W and L, when a lead-in force is calculated later.

Meanwhile, if the conditional expression (4) is not satisfied (No in Step S206), the CPU 42 performs Step S208.

In Step S208, the CPU 42 determines whether the x-coordinate of the pointer P satisfies the following conditional expression (5).

$$(x_0-W) \leq x \leq (x_0-L) \qquad \text{Conditional Expression (5)}$$

This is obtained by applying the prior conditional expression (3) to the negative direction. That is, if the x-coordinate of the pointer P is positioned in the display area $(x_0-W)$ of the button BL in the negative direction and is positioned at a position distant from the central position by the prescribed distance L or more, the CPU 42 determines that the conditional expression (5) is satisfied (Yes) and then performs Step S209.

In Step S209, the CPU 42 changes the current x-coordinate of the pointer P into the central coordinate $x_0-L$. Accordingly, it is considered as follows: the indicated position of the pointer P is positioned at a position, which is shifted from the central position of the button BL in the negative direction of the x-axis direction by the distance L, when a lead-in force is calculated later.

In contrast, if it is determined that the conditional expression (5) is not satisfied (No in Step S208), the CPU 42 performs Step S210.

In Step S210, the CPU 42 determines whether the x-coordinate of the pointer P satisfies the following conditional expression (6).

$$x < (x_0-W) \qquad \text{Conditional Expression (6)}$$

That is, if the x-coordinate of the pointer P is positioned outside the display area $(x_0-W)$ of the button BL as seen in the negative direction, the CPU 42 determines that the conditional expression is satisfied (Yes) and then performs Step S211.

In Step S211, the CPU 42 adds $(W-L)$ to the x-coordinate in this case $(x=x+(W-L))$. Accordingly, it is considered as follows: the indicated position of the pointer P is positioned at a position, which is shifted toward the central position of the button BL in the x-axis direction by the specific distance $(W-L)$, when a lead-in force is calculated later.

In any case, if any one of the above-mentioned Steps S204, S207, S209, and S211 is performed according to the current x-coordinate of the pointer P, the CPU 42 performs Step S212.

Meanwhile, if it is determined that the conditional expression (6) is not satisfied (No in Step S210), the CPU 42 proceeds to Step S212 in particular without changing the x-coordinate. In this case, it means that the x-coordinate is positioned between the central position and the prescribed position $C_{L1}$ or $C_{L2}$.

In Step S212, the CPU 42 calculates a distance d" between the central position of the button BL and the indicated position of the pointer P when the x-coordinate is changed or not changed. The calculation in this case may be performed using, for example, the following expression.

$$d''=\sqrt{(x-x_0)^2+(y-y_0)^2}$$

In Step S214, after that, the CPU 42 calculates a scalar quantity $|\vec{F}|$ of a specific lead-in force from a correspondence relationship between the distance d" and the magnitude $|\vec{F}|$ of the lead-in force. The calculation method is the same as that of the first example of the procedure.

In Step S216, the CPU 42 calculates a lead-in force $(\vec{F})$ to be applied, from the lead-in force $|\vec{F}|$ and the lead-in direction (unit vector $\vec{t}$) that is initially required.

If the above-mentioned procedure is performed, the CPU 42 returns to the device management process and then performs the actuator driving process (Step S50 in FIG. 5). Accordingly, an operational force is actually applied to the operation stick 20, so that a lead-in force $(\vec{F})$ is generated and operation feeling is given to a user.

Illustration of Second Example of Procedure

FIG. 9 is a view showing an image of the lead-in force that is generated by the second example of the procedure and a d"-$|\vec{F}|$ diagram that can be used for the calculation of the scalar quantity $|\vec{F}|$.

Image of Lead-In Force

Figure 9A:
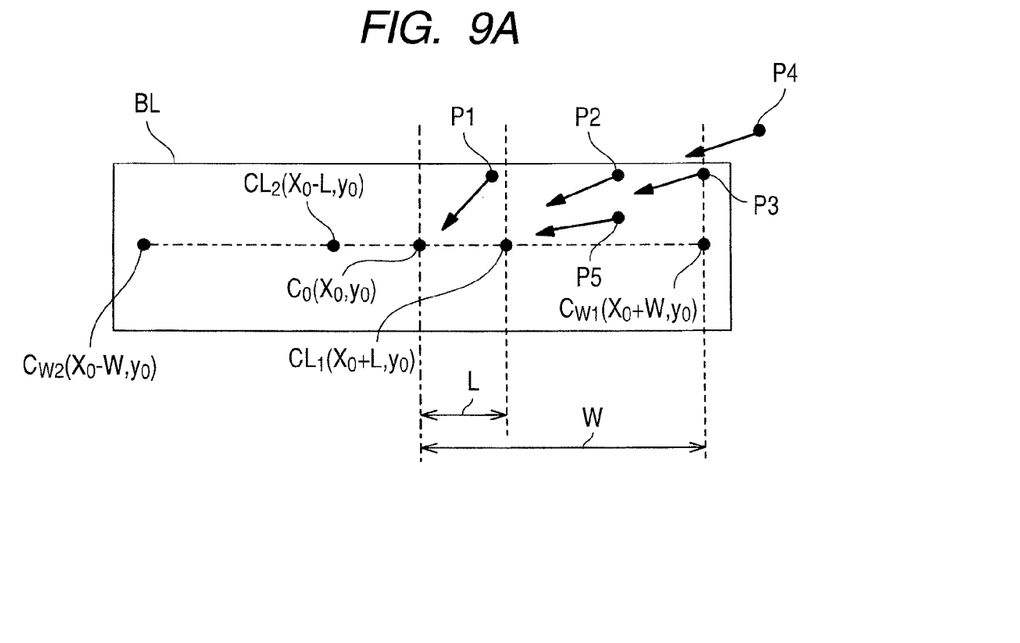
FIG. 9 is a d"-|$\vec{F}$| diagram and an image view of a lead-in force that is generated by the second example of the procedure.

Referring to FIG. 9A, even in the case of the second example of the procedure, it is possible to generate a sufficient lead-in force at each of the indicated positions P1 to P5 of a button BL of which the length in the horizontal direction (x-axis direction) is larger than that in the vertical direction (y-axis direction).

Figure 9B:
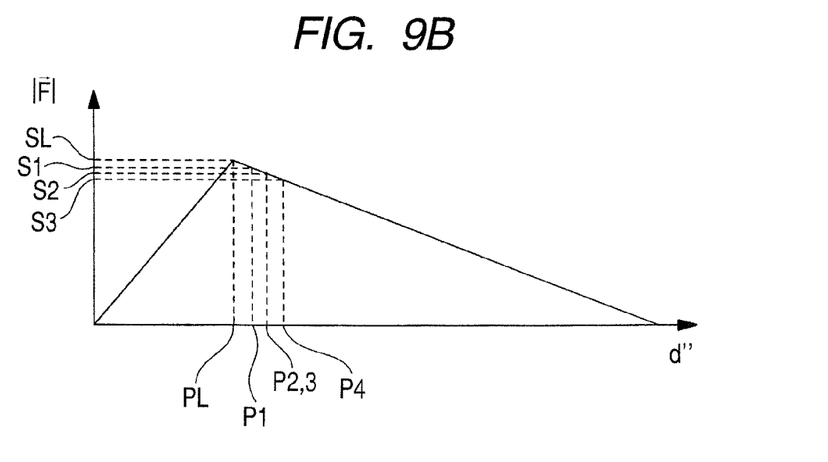

Further, in FIG. 9B, a relationship between the distance d" and the scalar quantity $|\vec{F}|$ is the same as that of the first example of the procedure.

Indicated Position P1

The x-coordinate of the indicated position P1 is positioned between the central position and the prescribed position $C_{L1}$ or $C_{L2}$ in the display area of the button BL. In this case, since the conditional expression (6) is not satisfied (No in Step S210), the distance d" to the indicated position P1 is calculated in particular without the change of the x-coordinate. As a result, a lead-in force S1, which is large to some extent, is generated at the indicated position P1.

Case of "$(x_0+L) \leq x \leq (x_0+W)$"

Indicated Position P2 and P3

Since the x-coordinates of indicated positions P2 and P3 are positioned in the range that is within the central coordinate $x_0+W$ from the central coordinate $x_0+L$, the conditional expression (3) is satisfied (Yes in Step S202). Accordingly, the distance d" is calculated while the x-coordinate is used as the central coordinate $x_0+L$.

If the scalar quantity $|\vec{F}|$ of each of the indicated positions P2 and P3 is required, a scalar quantity S2 corresponding to the calculated distance d" is obtained. As a result, a lead-in force S2 toward the central position is generated even at the indicated positions P2 and P3 that are distant from the central portion to some extent.

Indicated Position P5

Further, since the x-coordinate of the indicated position P5 is also positioned in the range that is within the central coordinate $x_0+W$ from the central coordinate $x_0+L$, the conditional expression (3) is satisfied likewise (Yes in Step S202). Therefore, a sufficient lead-in force toward the central position is generated even at the indicated position P5.

Case of "$x<(x_0-W)$" or "$(x_0+W)<x$"

Indicated Position P4

The indicated position P4, which is positioned outside the display area of the button BL, will be considered below. The x-coordinate of the indicated position P4 is distant from the central coordinate $x_0$ by a distance larger than the distance W. In this case, if the indicated position P4 satisfies the conditional expression (4) (Yes in Step S206), the distance d" is calculated while a position shifted toward the central coordinate by the specific distance (W−L) is used as the x-coordinate at this time.

Further, if the scalar quantity $|\vec{F}|$ of the indicated position P4 is required from the relationship diagram, a scalar quantity S3 corresponding to the obtained distance is obtained. As a result, a lead-in force S3 toward the central position is generated at the indicated position P4, and a lead-in force at that time is slightly smaller than that at each of the indicated positions P1, P2, P3, and P5.

As described above, the CPU 42 of the control unit 40 calculates a lead-in force by the second example of the procedure. Accordingly, for example, even though the indicated position of the pointer P becomes distant from the central position in the horizontal direction in the display area of the horizontally elongated button BL, it is possible to continuously generate a sufficient lead-in force. Further, even though the indicated position of the pointer P is positioned outside the display area of the button BL in the horizontal direction, it is possible to likewise generate a sufficient lead-in force.

Comparison Between the First and Second Examples of Procedures

Since the x-coordinate is uniformly shifted toward the central position in the display area of the button BL, the magnitude of the lead-in force depends on the y-coordinate in the first example of the procedure. In contrast, since the x-coordinate may be shifted to the prescribed position $C_{W1}$ or $C_{W2}$ in the second example of the procedure, it is possible to generate a large lead-in force depending on not only y-coordinate but also the x-coordinate.

The invention is not limited to each of the above-mentioned embodiments, and may be modified so as to be used. For example, the shape of the button BL may include not only a rectangular shape but also an oval shape and an elliptical shape. Further, the button BL not only may be elongated in a horizontal direction but also may be elongated in a vertical direction or elongated in an oblique direction.

Further, the relationship between the distance d' or d" and the lead-in force $|\vec{F}|$ is not limited to the examples shown in the drawings, and another relationship (for example, a relationship like a quadratic curve) may be employed.

Meanwhile, a ratio between the length of the button in the vertical direction and the length of the button in the vertical direction is initially calculated in the lead-in force calculating process (FIGS. 6 and 8). Only if the result of the calculation is equal to or larger than a predetermined value (for example, an aspect ratio is 3 or more), the x-coordinate may be changed.

In addition, the shape and disposition of various members shown in the drawings correspond to preferred examples, and may be appropriately modified when the invention is embodied.

It should be understood by those skilled in the art that various modifications, combinations, sub-combinations and alterations may occur depending on design requirements and other factors insofar as they are within the scope of the appended claims of the equivalents thereof.

What is claimed is:

1. An operation feeling giving input device comprising:
an operation member that is displaced to an arbitrary operational position according to the operation of an operator;
an actuator that changes the operational position of the operation member separately from the operation of the operator by applying an operational force to the operation member;
operational position detecting means that detects the operational position of the operation member;
storage means that stores information about display area of a button displayed on a predetermined display screen; and
control means that outputs a control signal for displaying a pointer on the display screen at an indicated position (x, y) corresponding to the operational position of the operation member, the control means driving the actuator to generate a lead-in force that changes the operational position of the operation member to move the pointer toward the inside of the button displayed on the display screen,
wherein the length of a display area of the button in a vertical direction is different from the length of the display area of the button in a horizontal direction,
wherein if a position in respect of a longitudinal central axis of the indicated position (x, y) of the pointer is positioned in a range corresponding to the display area of the button and satisfies $(x_0-W) \leq x \leq (x_0+W)$, W being a distance from a central position $(x_0, y_0)$ to a boundary of the display area of the button along the longitudinal central axis, the indicated position (x, y) of the pointer is changed to a changed position by changing the x coordinate (x) of the indicated position (x, y) into the x coordinate $(x_0)$ of the central position $(x_0, y_0)$,
wherein if the indicated position is positioned outside a range corresponding to the display area of the button and satisfies $(x_0+W)<x$, the indicated position (x, y) is changed to a changed position by shifting the indicated position (x, y) toward the central position $(x_0, y_0)$ by a predetermined distance along the longitudinal central axis, and wherein the control means calculates a magnitude of the lead-in force based on a distance between the central position of the display area of the button and the changed position of the pointer.

2. The operation feeling giving input device according to claim 1, wherein the lead-in force is determined based on a predetermined diagram having a correspondence relationship between the magnitude of the lead-in force and the distance between the central position of the display area of the button and the changed position of the pointer.

3. The operation feeling giving input device according to claim 1, wherein the control means determines a lead-in direction of the lead-in force to be a direction from the indicated position (x, y) of the pointer toward the central position $(x_0, y_0)$ of the button, regardless of the indicated position.

4. An operation feeling giving input device comprising:
an operation member that is displaced to an arbitrary operational position according to the operation of an operator;
an actuator that changes the operational position of the operation member separately from the operation of the operator by applying an operational force to the operation member;
operational position detecting means that detects the operational position of the operation member;
storage means that stores information about display area of a button displayed on a predetermined display screen; and
control means that outputs a control signal for displaying a pointer on the display screen at an indicated position (x, y) corresponding to the operational position of the operation member, the control means driving the actuator to generate a lead-in force that changes the operational position of the operation member to move the pointer toward the inside of the button displayed on the display screen,
wherein the length of a display area of the button in a vertical direction is different from the length of the display area of the button in a horizontal direction,
wherein if a position in respect of the longitudinal central axis of the indicated position of the pointer is positioned in a range corresponding to the display area of the button and is positioned at a position distant from the central position by a prescribed distance (L) or more, and satisfies $(x_0+L) \leq x \leq (x_0+W)$ or $(x_0-W) \leq x \leq (x_0-L)$, W being a distance from the central position $(x_0, y_0)$ to a boundary of the display area of the button along a longitudinal central axis, the indicated position (x, y) is changed to a changed position by shifting the indicated position (x, y) of the pointer toward the central position $(x_0, y_0)$ along the longitudinal central axis by the prescribed distance L,
wherein the control means calculates a magnitude of the lead-in force based on a distance between the central position of the display area of the button and the changed position of the pointer.

5. The operation feeling giving input device according to claim 4, wherein the lead-in force is determined based on a predetermined diagram having a correspondence relationship between the magnitude of the lead-in force and the distance between the central position of the display area of the button and the changed position of the pointer.

6. The operation feeling giving input device according to claim 4, wherein the control means determines a lead-in direction of the lead-in force to be a direction from the indicated position (x, y) of the pointer toward the central position $(x_0, y_0)$ of the button, regardless of the indicated position.

* * * * *